US012584742B2

(12) United States Patent
Vercier et al.

(10) Patent No.: US 12,584,742 B2
(45) Date of Patent: Mar. 24, 2026

(54) METHOD FOR CORRECTING THE MEASUREMENT FROM A VIBRATING ANGULAR INERTIAL SENSOR

(71) Applicant: THALES, Courbevoie (FR)

(72) Inventors: Nicolas Vercier, Valence (FR); Jacques Coatantiec, Valence (FR)

(73) Assignee: THALES, Courbevoie (FR)

( * ) Notice: Subject to any disclaimer, the term of this patent is extended or adjusted under 35 U.S.C. 154(b) by 338 days.

(21) Appl. No.: 18/276,892

(22) PCT Filed: Feb. 15, 2022

(86) PCT No.: PCT/EP2022/053618

§ 371 (c)(1),
(2) Date: Aug. 11, 2023

(87) PCT Pub. No.: WO2022/175240

PCT Pub. Date: Aug. 25, 2022

(65) Prior Publication Data

US 2024/0110790 A1 Apr. 4, 2024

(30) Foreign Application Priority Data

Feb. 19, 2021 (FR) ...................................... 2101546

(51) Int. Cl.
*G01C 25/00* (2006.01)
*G01C 19/5747* (2012.01)
*G01C 21/16* (2006.01)

(52) U.S. Cl.
CPC ....... *G01C 19/5747* (2013.01); *G01C 25/005* (2013.01); *G01C 21/188* (2020.08)

(58) Field of Classification Search
CPC G01C 19/5747; G01C 25/005; G01C 21/188; G01C 19/567; G01C 19/5719;
(Continued)

(56) References Cited

U.S. PATENT DOCUMENTS 6,598,455 B1 7/2003 Gutierrez et al.

FOREIGN PATENT DOCUMENTS

EP 0 392 104 A1 10/1990
EP 2 960 625 A1 12/2015
(Continued)

*Primary Examiner* — Robert R Raevis
(74) *Attorney, Agent, or Firm* — BakerHostetler

(57) ABSTRACT

A measurement of a vibrating inertial sensor disposed on a carrier and includes a resonator extending around two mutually perpendicular x and y axes defining an xy sensor frame of reference and comprising: at least one vibrating movable mass comprising at least two portions configured to vibrate in phase opposition in a direction x' defining an x'y' wave frame of reference, with the vibration wave forming an electrical angle $\theta$ relative to the x-axis; at least a pair of excitation transducers and a pair of detection transducers operating along the two axes x and y; the correction method being applied when the sensor is operating with a vibration wave vibrating along the x'-axis and comprising the following steps, when the carrier is substantially stationary: A commanding an electrical rotation of the vibration wave according to a commanded angular velocity $\Omega c$, such that the electrical angle $\theta$ scans at least one angular range of $k\pi$ radians; then B retrieving the measured angular values $\Omega e$ measured by the inertial sensor over the angular range, and determining the mean $\Omega em$ of the angular values measured; then C subtracting the commanded angular velocity $\Omega c$ from the mean $\Omega em$; with steps A to C being carried out for at least two different commanded angular velocities so as to determine at least two means of the measured angular values; then D determining: the mean electrical scale factor error FEem, and the actual angular value $\Omega v$ of the carrier plus a drift value Dm of the sensor, the determining being carried out on the basis of the commanded angular velocity $\Omega c$ and of the means $\Omega em$ of the measured angular values, according to the following formula:
(Continued)

$\Omega em - \Omega c = (\Omega v + Dm) + FEem \cdot \Omega c.$

10 Claims, 3 Drawing Sheets

(58) Field of Classification Search
CPC ............ G01C 19/5755; G01C 19/5762; G01C
19/574
USPC ............. 73/1.75, 1.77, 1.78, 504.12, 504.14;
702/92–95
See application file for complete search history.

(56) References Cited

FOREIGN PATENT DOCUMENTS

| | | | |
|----|---------------|----|---------|
| FR | 2 937 414 | A1 | 4/2010 |
| FR | 2 939 192 | A1 | 6/2010 |
| FR | 2 958 029 | A1 | 9/2011 |
| FR | 2 959 009 | A1 | 10/2011 |
| WO | 2010/072922 | A1 | 7/2010 |
| WO | 2016/189078 | A1 | 12/2016 |

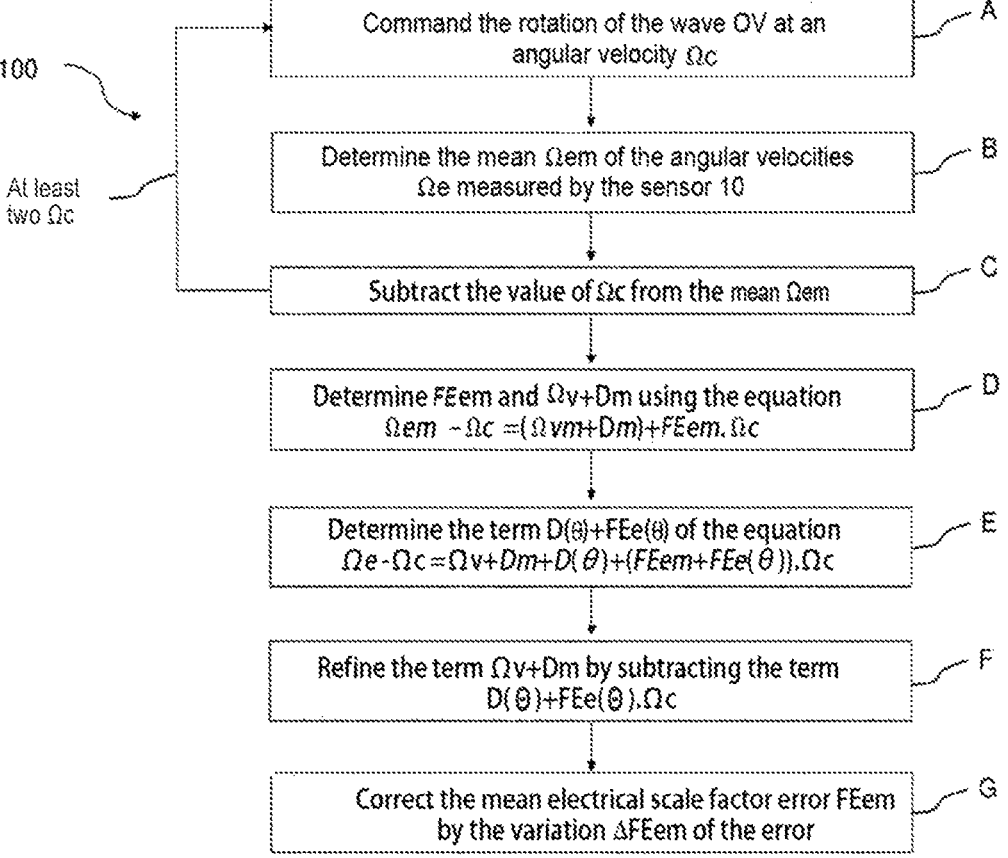

100

At least
two Ωc

A — Command the rotation of the wave OV at an angular velocity Ωc

B — Determine the mean Ωem of the angular velocities Ωe measured by the sensor 10

C — Subtract the value of Ωc from the mean Ωem

D — Determine FEem and Ωv+Dm using the equation
$\Omega em - \Omega c = (\Omega vm + Dm) + FEem.\Omega c$ E — Determine the term D(θ)+FEe(θ) of the equation
$\Omega e - \Omega c = \Omega v + Dm + D(\theta) + (FEem + FEe(\theta)).\Omega c$ F — Refine the term Ωv+Dm by subtracting the term
$D(\theta) + FEe(\theta).\Omega c$ G — Correct the mean electrical scale factor error FEem by the variation ΔFEem of the error

FIG.4

METHOD FOR CORRECTING THE MEASUREMENT FROM A VIBRATING ANGULAR INERTIAL SENSOR

CROSS-REFERENCE TO RELATED APPLICATIONS

This application is a National Stage of International patent application PCT/EP2022/053618, filed on Feb. 15, 2022, which claims priority to foreign French patent application No. FR 2101546, filed on Feb. 19, 2021, the disclosures of which are incorporated by reference in their entireties.

FIELD OF THE INVENTION

The field of the invention is that of vibrating inertial sensors, in which at least two masses are vibrated, or even a single mass comprising at least two portions, with one mass or a portion of a mass being able to deform relative to the other. Without being limiting, the invention notably relates to inertial sensors of the MEMS type that can have a planar structure, for example, sensors micro-machined in a support plate. The invention relates to an angular measurement method (angle or angular velocity) and in particular to a method for correcting such a measurement.

BACKGROUND

Vibrating inertial sensors (or tuning fork sensors) are known to a person skilled in the art. A vibrating inertial sensor comprises a resonator, which can be, but may not necessarily be, axisymmetric, associated with means for vibrating the resonator and means for detecting an orientation of the vibration (vibration wave) relative to a frame of reference of the sensor. These means generally comprise at least two groups of actuators secured to the housing of the sensor and/or of the resonator and at least two groups of detectors also secured to the housing and/or the resonator.

For the sake of simplification, throughout the present description an angular inertial sensor can be equally referred to as an "inertial sensor" or an "angular sensor" or even as a "sensor".

Such a sensor is disposed on a carrier in order to measure the angle and/or angular velocity values of said carrier. The carrier can be all or part of an airplane, a ship, a train, a truck, a car, a satellite or of any other air, land or maritime vehicle.

Notably, inertial sensors exist that are micro-machined in a thin, flat plate, allowing measurement of an angular position (gyroscope) or of an angular velocity (gyrometers), which sensors are notably described in document EP 2960625. The main features are reviewed below.

Manufacturing these micro-machined sensors, also called "MEMS" (Micro-Electro-Mechanical-Systems) sensors, uses collective micro-machining, etching, doping deposition techniques, etc., similar to those that are used for manufacturing electronic integrated circuits, enabling low production costs.

The MEMS sensors described in application EP 2960625 are made up of two vibrating movable masses M1 and M2, illustrated in FIG. 1, concentrically disposed around each other and excited so as to vibrate in tuning fork mode in the plane of the plate (the xy plane in FIG. 1) via one or more excitation transducers. The two masses are suspended at fixed anchoring points A of the plate by suspension springs RS (orthotropic). The two masses are coupled together by stiffening elements RC. The general aim is to acquire, by construction, a stiffness along x that is equal to a stiffness along y and a zero coupling stiffness between x and y. The useful vibration mode corresponds to a linear vibration of the two masses in phase opposition.

More generally, more than two movable masses can be involved, for example, four movable masses, or, conversely, a single mass comprising at least two portions, with one being able to deform relative to the other, for example, on a hemispherical resonator micro-gyrometer ($\mu$HRG).

The structure described in application EP 2960625 forms a resonator system (called "resonator") with two masses coupled together by Coriolis acceleration. When the sensor rotates about the z-axis perpendicular to the xy plane, with the z-axis being called "sensitive axis", the composition of the forced vibration with the angular rotation vector generates, by the Coriolis effect, forces that cause the movable masses to naturally vibrate perpendicular to the excitation vibration and to the sensitive axis; the amplitude of the natural vibration is proportional to the rotation speed. The electronics associated with the sensor compute the amplitude of the natural vibration in the direction orthogonal to the excitation direction irrespective of said excitation direction (assumed to be known).

The sensor can operate in gyrometer mode: the excitation direction is kept fixed by modifying the excitation, and, consequently, the axis perpendicular to this vibration is kept fixed relative to the housing of the sensor and the output information then reflects the required energy needed to be applied to the excitation transducers in order to keep the natural vibration direction fixed despite any movements of the housing. Measuring this energy (or "counter force") grants access to the angular velocity Q of the sensor.

The sensor can also operate in gyroscope mode: the direction of the excitation vibration is left free and is detected in order to provide the angular orientation of the sensor relative to an inertial frame of reference, which also simply can be called "angle". The angular velocity of the sensor also can be deduced by deriving the angle measurement.

The entire structure of the resonator described in application EP 2960625 is axisymmetric about the two x and y axes defining a sensor frame of reference, as illustrated in FIG. 1. "Axisymmetric" is understood to mean that the structure is symmetrical relative to x and is symmetrical relative to y. However, it should be understood that this definition can cover all possible minor dissymmetries. As described hereafter, these axes form the main directions of the actuators and detectors, which operate along these two axes.

In order to excite the useful vibration mode in any given direction of the plane, the excitation signal is divided into two components of adjusted respective amplitudes. As illustrated in FIG. 2, the two amplitude components can be respectively applied to the excitation transducer Ex acting in the direction x and to the excitation transducer Ey acting in the direction y, with the two excitation transducers being associated with at least one movable mass (internal mass M1 in FIG. 2). Excitation forces are therefore applied to these transducers in order to generate and maintain the vibration wave: they are able to maintain the forced vibration via an amplitude command Ca (countering the damping of the sensor) and in any direction of the xy plane, via a precession command Cp (rotate the wave).

The axis of vibration of the wave is referred to as the x'-axis. This axis defines an x'y' frame of reference, with y' being perpendicular to x' in the plane of the sensor (by way of a reminder, the main axes of the sensor are x and y). The x'-axis forms, with the x-axis, an angle $\theta$, called "electrical angle", and the x'y' frame of reference is called "wave frame of reference". This is illustrated in FIG. 3.

The excitation forces FX and FY applied along the x-axis and the y-axis of the sensor are derived from commands Cr, Ca, Cq and Cp computed in the wave frame of reference by automatic controls known to a person skilled in the art, on the basis of the demodulation of the detected signals relating to the displacement of the vibration. On the basis of the measurements of the movement of the X and Y wave produced in the xy frame of reference, a rotation is applied in order to switch to the x'y' wave frame of reference, and then the commands are determined (via a demodulation of detected signals) and a reverse rotation is reapplied in order to return to the x,y sensor frame of reference, in which the excitation forces are applied. The commands are determined so that the movement of the mass, i.e., the vibration wave of the sensor, assumes a desired shape. Generally, the desired shape of the wave is a linear displacement oscillating in the x' direction relative to the xy sensor frame of reference. However, the wave is generally elliptically shaped, substantially flat in the direction perpendicular to the direction x' (in other words the minor axis of the ellipse is very small relative to the major axis, which major axis corresponds to the given direction).

The command Cr corresponds to the stiffness forces for controlling the natural frequency of the resonator. Since the phase is connected to the integral of the frequency, Cr therefore controls the phase of the wave.

The command Ca corresponds to the amplitude forces for compensating for the effect of the damping forces of the sensor and for keeping the amplitude of the vibration constant: it therefore allows the amplitude of the wave to be controlled.

The command Cp corresponds to the precession forces that allow the angular velocity of the wave to be controlled.

In the case of a sensor operating in gyrometer mode, a precession command Cp is applied so as to slave the orientation of the vibration (or electrical angle) to a constant setpoint value.

The command Cq corresponds to the quadrature forces for controlling the quadrature of the wave. i.e., to guarantee the linearity of the wave or, when the desired wave is not linear, it is generally elliptical, Cq allows the minor axis of the ellipse to be controlled.

The movements of the resulting wave are detected by combining the information gathered by at least one pair of detection transducers Dx, Dy retrieving the position of the mass as it passes through the xy sensor frame of reference and associated with at least one movable mass (M1 in FIG. 2). FIG. 2 shows two pairs of detection transducers Dx, Dy.

According to a known and advantageous alternative embodiment, transducers can be produced on the two masses M1 and M2 (not shown). FIG. 2 and this alternative embodiment are non-limiting examples of an arrangement; many other types of arrangement are possible, with the limitation of producing an axisymmetric system.

The sensor thus formed from a resonator Res associated with the excitation E and detection D transducers is connected to a processing unit UT, as illustrated in FIG. 3. FX and FY are the excitation forces applied along the x-axis and the y-axis of the sensor, X and Y are the measurements of the movement of the wave in the xy sensor frame of reference. The vibration wave OV vibrates along x' with an electrical angle θ. The processing unit UT proceeds with the various computations for the automatic controls and generates, for the corrections, all the aforementioned commands/forces Cr, Ca, Cq and Cp for the various transducers. In the processing unit UT, the detected movements X and Y are firstly transformed into the x'y' wave frame of reference by a rotation along 0 and then the excitation commands are determined in the wave frame of reference by automatic controls in the form of electrical voltages U'x and U'y with, for example:

$$U_x'=iC_a+C_r$$

$$U_y'=iC_p+C_q$$

The transducers are preferably produced by interdigitated comb electrodes with air gap variation. There is a fixed comb with teeth that are secured to a fixed mass of the machined plate and a movable comb with teeth, which are interdigitated with the teeth of the fixed comb, that are secured to the movable mass associated with the considered transducer.

Excitation involves applying an excitation force via an alternating voltage between the movable comb and the fixed comb, at the desired vibration frequency (mechanical resonance frequency of the suspended movable mass, typically of the order of a few KHz). The movement that is generated is perpendicular to the teeth of the comb.

Detection involves applying a bias voltage between the fixed comb and the movable comb and observing the load variations that result from the variations in capacitance between the fixed comb and the movable comb due to the variations in the spacing between the teeth of the fixed comb and the movable comb. The measured movement is the movement perpendicular to the teeth of the comb. Alternatively, in another configuration, the movement longitudinal to the teeth of the combs can be measured.

Under the effect of any production errors, the measurements provided by these axisymmetric vibrating inertial sensors have measurement errors or "drift" (errors estimating the angular velocity in gyrometer mode or the angle in gyroscope mode), and result in a degradation of the level of precision of the values thus measured, and this is the case whether they are used in gyroscope mode or in gyrometer mode.

It is known that the drift of the sensor varies as a function of the electrical angle θ. It is also known that an axisymmetric vibrating inertial sensor has, after calibrating any electronic errors and balancing, a mean drift (which is defined as being the drift acquired by averaging the drifts acquired for various evenly distributed electrical angles) that is very low, typically between ten and one hundred times lower than the maximum drift of said sensor for a given electrical angle.

In order to measure an angular velocity or an angle for which the error is the mean drift, one solution involves rotating the vibration wave. In order to be able to rotate the vibration wave, a rotation command needs to be sent that will be found in the output signal. Eliminating this rotation command (although known) from the output of the sensor is not simple since said command is deformed by the transfer function of the sensor between the injected command and the command found on the signal of said sensor, and therefore it is not simply necessary to subtract the rotation command in order to find the useful signal.

The term "transfer function" of the sensor is understood to mean the function that has an injected angular velocity as input and the measured angular velocity as output.

Many patents use the rotation command of the wave and its correction, for example, in U.S. Pat. No. 6,598,455 B1, which relates to a method for calibrating a MEMS vibrating gyroscope comprising introducing a simulated rotation signal into the gyroscope, detecting the movement created by the simulated rotation signal and combining a correction signal of the detected movement with the simulated rotation signal. More specifically, electrostatic elements already present in the MEMS vibrating gyroscope are used to simulate Coriolis forces, and the simulated rotation signal is added to the closed-loop excitation force rebalancing system in order to carry out an inertial test on MEMS vibrating gyroscopes, without using a rotation table. However, sending such a signal disrupts the measurement of the sensor and generates errors due to the scale factor, and the aforementioned patent does not provide means for removing these generated errors if the intention is to use the method in real time and not only during a calibration.

The term "scale factor" is understood to mean the ratio between the angular velocity (or more broadly the angular value) measured at the output, where the measurement bias has been removed, and the angular velocity (or more broadly the angular value) commanded as input (electrically injected for an electrical scale factor or by rotation of the sensor for a mechanical scale factor).

Solutions are known for removing the scale factor error, and for reducing the errors generated by the solution described above. Patent application EP 0392104 A1, for example, describes a sensor in which the sensitive axis is rotated by 180° in order to remove the scale factor error. In other patent applications, namely FR 2937414, FR 2959009 and FR 2958029, the solutions for removing the scale factor error correspond to a combination of U.S. Pat. No. 6,598, 455 B1 and EP 0392104 A1 described above and involve sending a command for rotating the wave on a setpoint value suitable for rotating the wave in one direction and then in the opposite direction, with a zero mean control signal over a given period of time (FR 2937414 and FR 2958029), and optionally by adding a step in which the time drift of the setpoint is deduced from the command (FR 2958029). In these two patents FR 2937414 and FR 2958029, the problem is that it is not enough to subtract the introduced command in order to remove the errors induced by said command on the sensor because said rotation command is deformed by the transfer function of the sensor, as explained above. Thus, these solutions induce new errors in the measurement. Furthermore, in patent application FR 2959009, provision is made to remove these new errors induced by the rotation command of the wave, using an external reference sensor. Thus, the error introduced by the command is compensated by means of an additional external sensor.

Thus, the proposed solutions are based on rotation commands that generate new errors. It can be seen that rotating the wave in a permanent direction means that it is possible to benefit from the mean drift, but a new drift generated by the scale factor appears, and the fact that the wave is rotated in one direction and then in the opposite direction induces errors that cannot be easily subtracted due to the transfer function of the sensor. Furthermore, the use of an external measurement providing a reference output value generates a larger, more expensive system, which consumes more.

SUMMARY OF THE INVENTION

The invention aims to overcome the aforementioned disadvantages of the prior art.

More specifically, it aims to provide a method for correcting the measurement of an inertial sensor, which allows any measurement errors to be reduced and which does not require an additional reference sensor.

A first aim of the invention for overcoming these disadvantages is a method for correcting the measurement of an inertial sensor, said inertial sensor being disposed on a carrier and comprising a resonator extending around two mutually perpendicular x and y axes defining an xy sensor frame of reference and comprising:

at least one vibrating movable mass, with said at least one movable mass comprising at least two portions configured to vibrate in phase opposition at a vibration pulsation and in a direction x' defining an x'y' wave frame of reference, with the vibration wave along x' forming an electrical angle $\theta$ relative to the x-axis;

a plurality of electrostatic transducers controlled by electrical voltages and operating along the two axes x or y, with said transducers comprising at least:

a pair of detection transducers configured to detect the movements of the vibration wave along x and y;

a pair of excitation transducers, to which excitation forces are respectively applied along x and y, via a plurality of excitation commands determined by automatic controls from the detected movements, configured to maintain the wave at a constant amplitude via an amplitude command and, optionally, to rotate said vibration wave via a precession command;

the correction method being applied when the sensor is operating with a vibration wave vibrating along the x'-axis;

said method comprising the following steps, when the carrier is substantially stationary:

A commanding an electrical rotation of the vibration wave according to a commanded angular value $\Omega c$, such that the electrical angle $\theta$ scans at least one angular range of $k\pi$ radians, with k being an integer greater than or equal to 1; then B retrieving the measured angular values $\Omega e$ measured by the inertial sensor over the angular range of kit radians of the electrical angle $\theta$ for the commanded angular value $\Omega c$, and determining the mean $\Omega em$ of said angular values measured over said angular range; then C subtracting the commanded angular value $\Omega c$ from the mean $\Omega em$ of the measured angular values;

with steps A to C being carried out for at least two different commanded angular values so as to determine at least two means of the measured angular values; then D determining:

the mean electrical scale factor error FEem, with the electrical scale factor corresponding to the ratio between the measured angular value due to the electrical rotation command, and the commanded angular value $\Omega c$; and the actual angular value $\Omega v$ of the carrier plus a drift value Dm of the sensor; said determining being carried out on the basis of the commanded angular values $\Omega c$ and of the means $\Omega em$ of the measured angular values, according to the following formula:

$$\Omega em - \Omega c = (\Omega v + Dm) + FEem \cdot c.$$

The angular value measured by the sensor is defined as being either an angular velocity (in gyrometer mode) or an angle (in gyroscope mode) of the carrier. It can be referred to as an "estimated" angular value. Similarly, the actual angular value of the carrier is defined as being either the actual angular velocity or the actual angle of said carrier.

"Mean" is understood to be a mean over different electrical angles distributed, preferably evenly, over the angular range of $k\pi$ radians.

"Substantially stationary" carrier is understood to mean that the carrier has a zero dynamic range (for example, the carrier is a stationary airplane without passengers and without crew on board) or has a low dynamic range (for example, the carrier is a stationary airplane with passengers and/or crew on board). In other words, a low dynamic range corresponds to roll and pitch movements of the order of a few degrees and translation movements along the vertical axis, so that the horizontal accelerometers detect the rotation, with a heading that is considered to be constant. As an alternative to an airplane, it can be a ship, a train, a truck, a car, a satellite or any air, land or sea vehicle.

The present invention involves commanding a rotation of the vibration wave when the dynamic range of the carrier is zero or at least low, so as to be able to eliminate any errors generated on the measurement signal by the rotation command.

With an alternating rotation command (rotation in one direction and in another direction) and with a zero mean, the error generated by the change of rotation is high and originates from the fact that the passband of the sensor is not infinite. When changing the direction of rotation, the sensor perceives an input step and the error on the measurement will be the high-frequency part of the step not taken into account in the transfer function of the sensor. In other words, the commanded rotation has a limited spectrum (like any physical signal that does not have infinite energy). If part of the spectrum is outside the passband of the sensor, it will not be detected by the sensor and therefore if the injected rotation command is subtracted at the output (it must be removed because this is not a physical rotation of the carrier), it will remain an error related to the fact that the sensor has only detected part of the commanded rotation. According to the invention, an alternative zero mean rotation is not commanded.

With a non-alternating command being sent, corresponding to the preferred embodiment of the invention, there will be an error when the rotation command is stopped or if different rotation speeds are commanded. The origin of the error is the same as for an alternating zero mean rotation command, as described above. The command can be introduced into a known transfer function model of the gyrometer; however, this mathematical representation may not be precise enough (in any case not precise enough to acquire the desired precision orders of magnitude of the order of a few tens of μrad)—the invention also involves assessing the consequences of this transfer function through a known type of command during a navigation phase in which the movements of the carrier are known in such a way as to subtract this error during navigation.

The correction method according to the invention can further comprise one or more of the following features taken alone or according to any possible technical combinations.

According to one embodiment, the correction method comprises an additional step involving, when the carrier is substantially stationary:
E determining the periodic drift $D(\theta)$ of the sensor as a function of the electrical angle $\theta$ and the periodic electrical scale factor error $FEe(\theta)$ as a function of the electrical angle $\theta$, on the basis of the measured angular values $\Omega e$ during at least one turn or fraction of a turn during an electrical rotation at a commanded angular velocity $\Omega c$, according to the following formula:

$$\Omega e - \Omega c = \Omega v + Dm + D(\theta) + (FEem + FEe(\theta)) \cdot \Omega c$$

According to one embodiment, the correction method comprises an additional step involving, with the carrier not necessarily being stationary:

F determining the actual angular value $\Omega v$ of the carrier plus a drift value $Dm$ of the sensor, by removing the periodic drift $D(\theta)$ and the periodic electrical scale factor error $FEe(\theta)$ determined in step E.

According to one embodiment, in which the carrier has a zero dynamic range, the actual angular value $\Omega v$ is equal to a projection $\Omega tp$ in the xy sensor frame of reference of the terrestrial rotation, which is considered to be constant.

According to one embodiment, in which the carrier has a low but a non-zero dynamic range, said actual angular value $\Omega v$ is equal to a projection $\Omega tp$ in the xy sensor frame of reference of the terrestrial rotation, which is considered to be constant, with the variations in angular velocity determined by at least one accelerometer on the carrier being subtracted. Preferably, the variations in angular velocity are determined by at least two accelerometers and the heading is considered to be a mean fixed heading.

According to one embodiment, the rotation command is applied in one direction along the angular range of $k\pi$ radians, and then in the opposite direction along the angular range of $k\pi$ radians. Alternatively, according to a preferred embodiment, the rotation command is always applied in the same direction.

According to one embodiment, the correction method comprises an additional step involving, with the carrier not necessarily being stationary:
G correcting the mean electrical scale factor FEem by the variation $\Delta FEem$ of the mean electrical scale factor error between a high dynamic range and the low or zero dynamic range, with said variation $\Delta FEem$ being determined by spectrally separating the angular velocity command of the wave $\Omega c$ from the actual angular value $\Omega v$.

A second aim of the invention is an inertial angular sensor, with said inertial sensor being disposed on a carrier and comprising a resonator extending around two mutually perpendicular x and y axes defining an xy sensor frame of reference and comprising:
- at least one vibrating movable mass, with said at least one movable mass comprising at least two portions configured to vibrate in phase opposition at a vibration pulsation and in a direction x' defining an x'y' wave frame of reference, with the vibration wave along x' forming an electrical angle $\theta$ relative to the x-axis;
- a plurality of electrostatic transducers controlled by electrical voltages and operating along the two axes x or y, including at least, on at least one of the two masses:
- a pair of detection transducers configured to detect the movements of the vibration wave along x and y; and
- a pair of excitation transducers, to which excitation forces are respectively applied along x and y, via a plurality of excitation commands determined by automatic controls from the detected movements, configured to maintain the wave at a constant amplitude via an amplitude command and, if applicable, to rotate said vibration wave via a precession command;
- the inertial angular sensor further comprising:
- a control and/or processing unit adapted to implement the steps of the correction method according to the first aim of the invention.

According to one embodiment, the inertial sensor is axisymmetric.

According to one embodiment, the inertial sensor comprises at least two vibrating movable masses forming the at least two portions configured to vibrate in phase opposition relative to each other, with a movable mass being able to be disposed around another movable mass.

The correction method and the inertial sensor according to the invention can comprise any one of the aforementioned features, taken alone or in any technically possible combinations with other features.

The following description describes several embodiments of the device of the invention: these examples by no means limit the scope of the invention. These embodiments describe both the essential features of the invention and any additional features related to the considered embodiments.

BRIEF DESCRIPTION OF THE DRAWINGS

Further features, details and advantages of the invention will become apparent upon reading the description, which is provided with reference to the accompanying figures, which are provided by way of an example and which represent, respectively:

FIG. 4 illustrates a correction method according to the invention.

Throughout these figures, identical reference signs can denote identical or similar elements.

In addition, the various parts shown in the figures are not necessarily according to a uniform scale, in order to make the figures more legible.

DETAILED DESCRIPTION

The correction method according to the invention applies to an inertial angular sensor comprising a resonator Res associated with means for vibrating the resonator and means for detecting an orientation of the vibration (vibration wave) relative to a frame of reference of the sensor.

Figure 1:
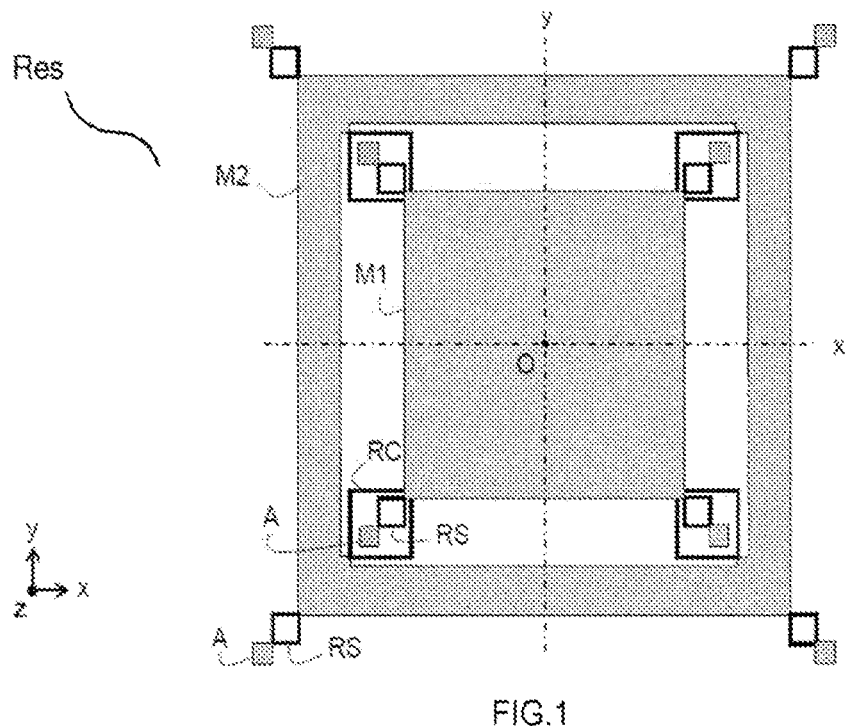
FIG. 1, already cited, illustrates the axisymmetric resonator of a MEMS inertial sensor according to the prior art, made up of two vibrating movable masses disposed one around the other.
Figure 2:
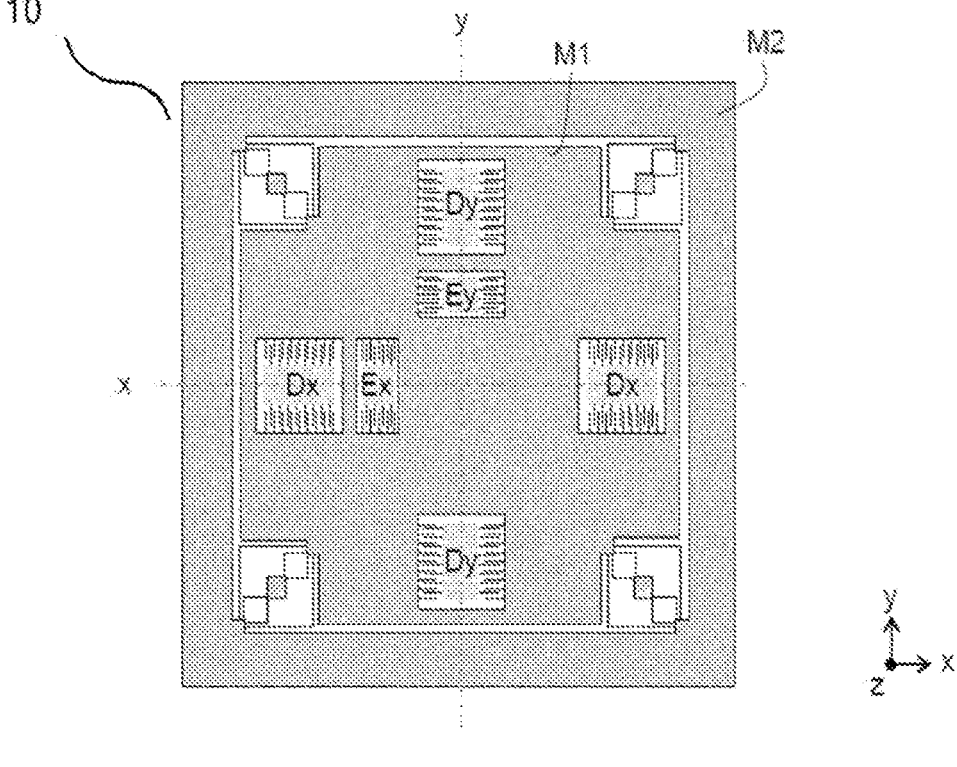
FIG. 2, already cited, illustrates the structure of a MEMS inertial sensor according to the prior art with an axisymmetric resonator around two x and y axes defining a sensor frame of reference.

The invention can be notably applied to one of the sensors described above, with reference to FIGS. 1 to 2, or to sensors according to the alternative embodiments also described above (at least one mass or at least two masses, an axisymmetric or non-axisymmetric sensor, a planar or non-planar structure, with the MEMS sensor being one embodiment).

Such an angular sensor is disposed on a carrier in order to measure the angle and/or angular velocity values of said carrier. The carrier can be all or part of an airplane, a ship, a train, a car, a satellite or any other air, land or sea vehicle.

Figure 3:
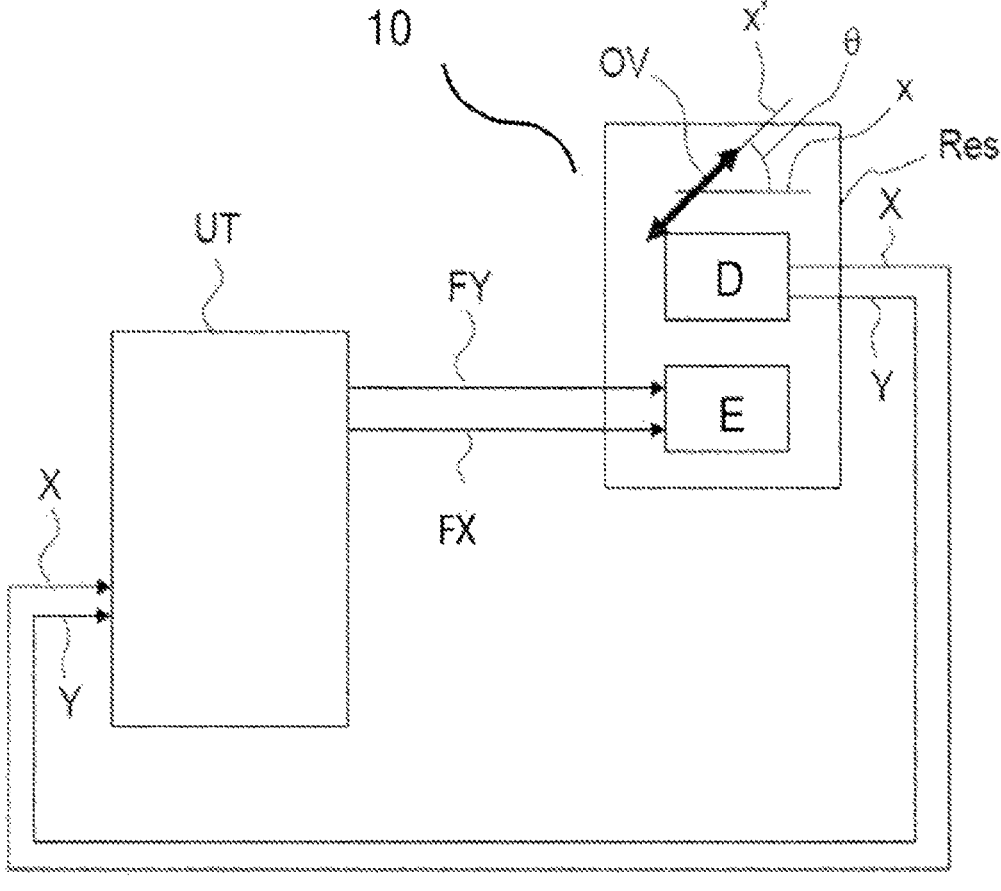
FIG. 3, already cited, illustrates the operation of an inertial sensor according to the prior art.

In addition, it is also possible to refer to the general operation of FIG. 3, with the processing unit UT being configured to apply the steps of the method according to the invention. It can be one or more modules added to the processing unit UT in order to carry out the steps of the correction method according to the invention.

The vibration wave OV vibrates according to a vibration pulsation ω. The correction method according to the invention is applicable to an inertial sensor operating in gyrometer mode or in gyroscope mode, with the automatic controls of the excitation commands being in operation.

In a vibrating inertial angular sensor, notably an axisymmetric angular sensor, there are two frames of reference: the xy sensor frame of reference, the x and y axes of which are the axes containing the excitation and detection transducers of the sensor, and the x'y' wave frame of reference, in which the x'-axis is the vibration axis of the wave OV and the y'-axis is the axis perpendicular to x' in the plane of the sensor. The x'-axis forms, with the x-axis, an angle θ, called "electrical angle", and the x'y' frame of reference is called "wave frame of reference".

The invention involves commanding a rotation of the vibration wave OV when the dynamic range of the carrier is zero or at least low, so as to be able to remove the errors generated on the measurement signal by the command.

Throughout the remainder of the detailed description, the considered angular value is the angular velocity. The computation logic would be the same considering the angle instead of the angular velocity (note, however, that in one embodiment, the computations are carried out according to the method taking into account the angular velocity as the angular value, and then returning to the angles by integration; or conversely, the computations are carried out according to the method by taking into account the angle as the angular value, then returning to the angular velocity by derivation).

Whether for the vibration wave or for the carrier, the terms "angular velocity" and "rotation speed" are used indifferently, denoting the same magnitude.

The method and the dynamic equations will be described in the case whereby the dynamic range is zero, i.e., the carrier is stationary, without movement other than the terrestrial rotation.

In a manner known to a person skilled in the art, the angular velocity Ωe measured by the sensor equals:

$$\Omega e = (1 + FEmm + FEm(\theta))\Omega v + Dm + D(\theta) + FT(\Omega c) \qquad \text{[Math.1]}$$

where:

Ωc is the speed of rotation of the commanded wave;

Ωv is the actual speed of rotation of the carrier;

FEmm is the mean mechanical scale factor error, independent of the angle θ;

with the mechanical scale factor being the scale factor related to a mechanical rotation;

FEm(θ) is the periodic mechanical scale factor error, with zero mean;

Dm is the mean drift of the sensor, independent of the angle θ;

D(θ) is the periodic drift of the zero mean sensor; and

FT(Ωc) corresponds to the commanded rotation speed Ωc passed through the transfer function of the sensor.

The transfer function can be expressed thus:

$$FT(\Omega c) = (1 + FEem + FEe(\theta))\Omega c \qquad \text{[Math.2]}$$

where:

FEem is the mean electrical scale factor error: with the electrical scale factor being the scale factor related to an electrical rotation; and FEe(θ) is the periodic electrical scale factor error, with zero mean.

Thus, equation Math. 1 becomes:

$$\Omega e = (1 + FEmm + FEm(\theta)) \cdot \Omega v + Dm + D(\theta) + (1 + FEem + FEe(\theta)) \cdot \Omega c \qquad \text{[Math.3]}$$

Knowing the commanded rotation speed Ωc, it can be subtracted from the output, which yields:

$$\Omega e - \Omega c = (1 + FEmm + FEm(\theta)) \cdot \Omega v + Dm + D(\theta) + (FEem + FEe(\theta)) \cdot \Omega c \qquad \text{[Math.4]}$$

Thus, all the terms on the left of the equation, Ωe and Ωc, are already known.

Furthermore, when stationary, the actual angular velocity of the carrier $\Omega v$ corresponds to a projection of the terrestrial rotation $\Omega tp$ that is considered to be constant for the computations.

Thus, for a zero dynamic range, the actual angular velocity of the carrier $\Omega v$ is low and since the errors of scale factors are also low, the product $(FEmm+FEm(\theta))\Omega v$ is negligible compared to the other terms of the equation. By placing the known terms on the left, and by neglecting (therefore by removing from the equation Math.4) the product $(FEmm+FEm(\theta))\cdot\Omega v$, the equation becomes:

$$\Omega e-\Omega c=\Omega v+Dm+D(\theta)+(FEem+FEe(\theta))\cdot\Omega c \qquad \text{[Math.5]}$$

Furthermore, as a mean on the angular range of $k\pi$ radians covered by the electrical angle $\theta$, the values of the periodic mechanical scale factor error $FEm(\theta)$ and of the periodic electrical scale factor error $FEe(\theta)$ are zero.

The angular velocity $\Omega e$ measured by the sensor can be measured for several electrical angles $\theta$, either for a continuous rotation, or for a series of angles distributed, possibly evenly, over the angular range of $k\pi$ radians. The mean $\Omega em$ of the measured angular velocities $\Omega e$ then can be determined over all the angles.

Furthermore, the mean $\Omega em$ of the measured angular velocities $\Omega e$ is found in the following equation, in which the terms $FEe(\theta)$ and $D(\theta)$ have been removed since they are zero on average over the angular range of $k\pi$ radians:

$$\Omega em-\Omega c=\Omega vm+Dm+FEem\cdot\Omega c \qquad \text{[Math.6]}$$

$\Omega vm$ designates the mean of the actual speed over the angular range of $k\pi$ radians. When stationary, the actual speed is equal to the average velocity, thus $\Omega vm=\Omega v$.

This equation has three unknowns: $\Omega v$, $Dm$ and $FEem$, but in practice, only the two values $(\Omega v+Dm)$, on the one hand, and $FEem$, on the other hand, can be observed. With two values of $\Omega c$, these two observable values can be deduced therefrom. The mean drift of the sensor $Dm$ cannot be observed because it cannot be distinguished from $\Omega v$, and $\Omega v$ is unknown since this is what is sought. Thus, ultimately, $(\Omega v+Dm)$ is available, on the one hand, i.e., the actual speed of rotation of the carrier tainted by the mean drift of the sensor and $FEem\cdot\Omega c$, and therefore $FEem$, is available, on the other hand.

The mean is produced at a rotation speed $\Omega c$ of the constant wave, and the carrier also keeps the same speed $\Omega v$, with a zero dynamic range, so that these terms are unchanged, likewise for the mean values $Dm$ and $FEem$, by definition.

FIG. 4 illustrates a correction method 100 comprising the following steps:

A commanding a rotation (electrical rotation) of the vibration wave OV according to at least one constant commanded angular velocity $\Omega c$, such that the electrical angle $\theta$ evenly scans at least one angular range of $k\pi$ radians, with k being an integer greater than or equal to 1; then B retrieving the measured angular values $\Omega e$ measured by the inertial sensor over the angular range of $k\pi$ radians of the electrical angle $\theta$ for the commanded angular velocity $\Omega c$, and determining a mean $\Omega em$ of the angular velocities measured over said angular range; then C subtracting the commanded angular velocity $\Omega c$ from the mean of the measured angular velocities $\Omega em$; with the operations A to C being carried out for at least two different commanded angular velocities; then D determining FEem and the actual angular velocity $\Omega v$ of the carrier tainted by the mean drift of the sensor $Dm$, using the formula expressed for each commanded angular velocity $\Omega c$:

$$\Omega em-\Omega c=(\Omega vm+Dm)+FEem\cdot\Omega c$$

The mean drift $Dm$ of the sensor is a remnant of factory calibration. It can be determined using another more precise angular sensor, or using external information, for example, when the carrier is stationary with a known heading.

Preferably, the commanded angular velocity $\Omega c$ can be given values for which provision is made for the angular sensor to be rotated when the carrier is in motion (for example, during navigation of the airplane or the displacement of the vehicle). This allows very good precision to be provided for FEem.

By having determined $\Omega v+Dm$ and FEem, the mean is left in order to return to equation Math.5:

$$\Omega e-\Omega c=\Omega v+Dm+D(\theta)+(FEem+FEe(\theta))\cdot\Omega c$$

In a step E, using several values of $\Omega e-\Omega c$ observed during a turn or a fraction of a turn, the term $D(\theta)+FEe(\theta)\cdot\Omega c$ can be determined (function of the electrical angle $\theta$) by removing/subtracting the mean $FEem\cdot\Omega c$ from each observation $\Omega e-\Omega c$.

With the term $D(\theta)+FEe(\theta)\cdot\Omega c$ thus being acquired for several electrical angles $\theta$ (continuous rotation or series of angles in the form of discrete values), it can be modelled in the form of a polynomial function. Alternatively, a table of correspondence of the values of $D(\theta)+FEe(\theta)\cdot\Omega c$ can be produced as a function of the various electrical angles $\theta$, which values are acquired by using the equation Math.5, as described above. Indeed, it is generally difficult to model the term $D(\theta)+FEe(\theta)\cdot\Omega c$ given that the errors and drifts have fairly strong non-linearities due to the fact that the rotation command has a spectrum that is greater than the bandwidth of the transfer function of the sensor.

When the carrier is no longer stationary but is navigating, it is possible to count on the stability of the term $D(\theta)+FEe(\theta)\cdot\Omega c$ that was measured when the carrier was stationary, as described above.

Once this term $D(\theta)+FEe(\theta)\cdot\Omega c$ is determined, in the form of a function of $\theta$ or of a table of correspondence as a function of $\theta$, it is thus possible, in a step F, to subtract it from the measurement $\Omega e-\Omega c$ in order to deduce therefrom and to refine the term $\Omega v+Dm$, even when the carrier is no longer stationary.

Thus, the invention allows an actual angular velocity value to be determined that is tainted by a lower drift value, since only $Dm$ remains, and it is therefore more precise than the methods of the prior art, and this is the case without having to have an additional sensor. Furthermore, the invention allows an angular value to be provided that is also more precise since it allows the term $D(\theta)+FEe(\theta)\cdot\Omega c$ to be reduced and thus allows the angular error that it can generate to be reduced. The angular error that may remain will be reduced insofar as it is a time-limited error and that it is thus much more negligible than the drifts that generate divergent errors over time.

Alternatively or additionally, it is also possible to contemplate filtering the rotation command so that it is in the passband of the sensor so that these non-linearities are much lower.

It is also possible to contemplate constructing an equivalent transfer function of the angular sensor and passing the rotation command into this equivalent transfer function in order to deduce the additional non-linearities therefrom.

In the case whereby the dynamic range is not zero but is low, the steps of the method and the equations described above are the same, but the actual angular velocity of the carrier $\Omega v$ does not only correspond to a projection of the terrestrial rotation. Indeed, the low dynamic range is defined as being that of a carrier that is not navigating (for example, it is located at its parking point), but which may experience small movements linked, for example, to the movements of the passengers and/or of the crew. Thus, the small movements of the carrier basically occur around the two horizontal axes (attitudes). It is then possible to determine the variations in attitudes using accelerometers, notably horizontal accelerometers, which are generally available in a vehicle. The angular velocity in this case is equal to the measured horizontal acceleration variation divided by the projection of the gravity, to which the projection of the terrestrial rotation is added. For example, if there is a sinusoidal pitch motion of amplitude A $\sin(\Omega vt \cdot \text{time})$ on a stationary airplane (with A being the amplitude of the oscillation and $\Omega vt$ being the angular velocity), the accelerometer in the longitudinal direction of the airplane will experience an acceleration equaling g·A $\sin(\Omega vt \cdot \text{time})$, where g denotes gravity, expressing a pitch variation of A $\sin(\Omega vt \cdot \text{time})$ and therefore an angular velocity of amplitude A$\Omega vt$. Thus, even for a low dynamic range, the actual angular velocity can be considered to be tainted with the error Dm.

Thus, for a zero dynamic range, equation Math.5 is available:

$$\Omega e-\Omega c=\Omega v+Dm+D(\theta)+(\text{FEem}+FEe(\theta))\cdot\Omega c$$

with $\Omega v=\Omega tp$ (projected terrestrial rotation) being considered to be constant for the computations (but not known).

For a low dynamic range equation, Math.5 is also available:

$$\Omega e-\Omega c=f\Omega+Dm+D(\theta)+(\text{FEem}+FEe(\theta))\cdot\Omega c$$

but with $\Omega v=\Omega tp+\Omega_{airplane}$ where $\Omega_{airplane}$ (variation in angular velocity due to the small movements of the carrier, in this case an airplane) is deduced from the accelerometric values.

Thus, the situation is once again that of the preceding case by subtracting $\Omega_{airplane}$:

$$\Omega e-\Omega c-_{airplane}=\Omega tp+Dm+D(\theta)+(\text{FEem}+FEe(\theta))\cdot\Omega c \qquad [\text{Math.7}]$$

Thus, with a zero dynamic range, the fact that the actual angular velocity of the carrier $\Omega v$ is constant (and corresponds to a projection of the terrestrial rotation $\Omega tp$), and with a low dynamic range, is used, thereby returning to the case of a zero dynamic range by subtracting the angular velocity variations determined by the accelerometers.

However, for a high dynamic range, the value of FEm is estimated with another technique, since there is no longer any assumption concerning $\Omega v$; this is explained hereafter.

The situation that occurs in the carrier when it is navigating (high dynamic range) will now be described.

When the dynamic range is no longer zero or low, it is possible to choose to count on the stability of the mean electrical scale factor error FEem.

Alternatively, in a step G, it is possible to correct the error by measuring the variations $\Delta$FEem of the mean electrical scale factor error FEem between the high dynamic range and the low or zero dynamic range. One way of determining the variations $\Delta$FEem is to spectrally separate the actual angular velocity variable $\Omega v$ and the angular velocity command of the wave $\Omega c$, i.e., to strictly select an angular velocity command $\Omega c$, the spectrum of which can be separated by filtering the useful spectrum of the actual angular velocity $\Omega v$. $\Omega c$ can be expressed, for example, in the form $\Omega c_0+\Omega cf$, where $\Omega c_0$ is a constant angular velocity allowing the angle to be rotated and $\Omega cf$ is expressed in the form of a harmonic function (sinusoidal, for example) selected outside the useful bandwidth of the sensor. Thus, by filtering, by going outside the useful bandwidth of the sensor and around the frequency of the function $\Omega cf$, it is possible to access the variations of the term $(\text{FEem}+FEe(\theta))\cdot\Omega cf$, and thus the value $\Delta$FEem, which is the variation of the mean electrical scale factor error FEem.

After correcting FEem and determining the term $D(\theta)+FEe(\theta)\cdot\Omega c$, as explained above, it is possible to revert to formula Math.4 in order to provide the actual speed of the carrier during navigation:

$$\Omega e-\Omega c-FEe(\theta)\cdot\Omega c-\text{FEem}\cdot\Omega c-D(\theta)=\Omega v+(\text{FEmm}+FEm(\theta))\Omega v+Dm$$

The determined terms are on the left of the equation, and thus the whole of the term on the left corresponds to a measured and corrected speed.

The mechanical scale factor errors FEmm+FEm(θ) and Dm can be adjusted in the factory in order to be the smallest possible during operation.

Thus, this allows a corrected actual angular velocity value to be determined, i.e., allows the estimate of said value to be refined.

In other words, the invention allows an actual angular velocity $\Omega v$ to be acquired that is only tainted with the errors FEmm+FEm(θ) and Dm that can be adjusted in the factory so as to be as low as possible, i.e., an angular velocity determined without the errors FEem, D(θ) and FEe(θ). This notably allows the term D(θ) to be removed, which term is much greater than the term Dm.

The various embodiments that have been described can be combined with one another, unless otherwise indicated.

Furthermore, the present invention is not limited to the embodiments described above, but extends to any embodiment falling within the scope of the claims.

The invention claimed is:

1. A method for correcting the measurement of a vibrating inertial sensor, said inertial sensor being disposed on a carrier and comprising a resonator (Res) extending around two mutually perpendicular x and y axes defining an xy sensor frame of reference and comprising:

at least one vibrating movable mass (M1), with said at least one movable mass comprising at least two portions configured to vibrate in phase opposition at a vibration pulsation (ω) and in a direction x' defining an x'y' wave frame of reference, with the vibration wave (OV) along x' forming an electrical angle θ relative to the x-axis;

a plurality of electrostatic transducers controlled by electrical voltages and operating along the two axes x and y, with said transducers comprising at least:

a pair of detection transducers (Dx, Dy) configured to detect the movements of the vibration wave along x and y;

a pair of excitation transducers (Ex, Ey), to which excitation forces are respectively applied along x and y, via a plurality of excitation commands determined by automatic controls from the detected movements, configured to maintain the wave at a constant amplitude via an amplitude command (Ca) and, optionally, to rotate said vibration wave via a precession command (Cp);

the correction method being applied when the inertial sensor is operating with a vibration wave (OV) vibrating along the x'-axis;

said method comprising the following steps, when the carrier is substantially stationary:

step A commanding an electrical rotation of the vibration wave (OV) according to a commanded angular value Qc, such that the electrical angle θ scans at least one angular range of kπ radians, with k being an integer greater than or equal to 1; then step B retrieving the measured angular values Ωe measured by the inertial sensor over the angular range of kπ radians of the electrical angle θ for the commanded angular value Ωc, and determining the mean Ωem of the angular values measured over said angular range; then step C subtracting the commanded angular value Qc from the mean Ωem of the measured angular values; with steps A to C being carried out for at least two different commanded angular values so as to determine at least two means of the measured angular values; then step D determining:

the mean electrical scale factor error FEem, with the electrical scale factor corresponding to the ratio between the measured angular value due to the electrical rotation command, and the commanded angular value Ωc; and the actual angular value Qv of the carrier plus a drift value Dm of the inertial sensor;

said determining being carried out on the basis of the commanded angular values Ωc and of the means Ωem of the measured angular values, according to the following formula:

$$\Omega em - \Omega c = (\Omega v + Dm) + FEem \cdot \Omega c.$$

2. The correction method as claimed in claim 1, comprising an additional step involving, when the carrier is substantially stationary:

step E determining the periodic drift D(θ) of the inertial sensor as a function of the electrical angle θ and the periodic electrical scale factor error FEe(θ) as a function of the electrical angle θ, on the basis of the measured angular values Ωe during at least one turn or fraction of a turn during an electrical rotation at a commanded angular velocity Ωc, according to the following formula:

$$\Omega e - \Omega c = \Omega v + Dm + D(\theta) + (FEem + FEe(\theta)) \cdot \Omega c.$$

3. The correction method as claimed in claim 2, comprising an additional step involving, with the carrier not necessarily being stationary:

step F determining the actual angular value Ωv of the carrier plus a drift value Dm of the inertial sensor, by removing the periodic drift D(θ) and the periodic electrical scale factor error FEe(θ) determined in step E.

4. The correction method as claimed in claim 1, with the carrier having a zero dynamic range, said actual angular value Ωv being equal to a projection Ωtp in the xy sensor frame of reference of the terrestrial rotation, which is considered to be constant.

5. The correction method as claimed in claim 1, with the carrier having a low but non-zero dynamic range, said actual angular value Ωv being equal to a projection Ωtp in the xy sensor frame of reference of the terrestrial rotation, which is considered to be constant, with the variations in angular velocity determined by at least one accelerometer on the carrier being subtracted, the variations in angular velocity preferably being determined by at least two accelerometers and by considering a mean fixed heading.

6. The correction method as claimed in claim 1, with the rotation command always being applied in the same direction.

7. The correction method as claimed in claim 1, comprising an additional step involving, with the carrier not necessarily being stationary:

step G correcting the mean electrical scale factor FEem by the variation ΔFEem of the mean electrical scale factor error FEem between the high dynamic range and the low or zero dynamic range, with said variation ΔFEem being determined by spectrally separating the angular velocity command of the wave Ωc from the actual angular value Ωv.

8. An inertial angular sensor, with said inertial angular sensor being disposed on a carrier and comprising a resonator (Res) extending around two mutually perpendicular x and y axes defining an xy sensor frame of reference and comprising:

at least one vibrating movable mass (M1), with said at least one movable mass comprising at least two portions configured to vibrate in phase opposition at a vibration pulsation (ω) and in a direction x' defining an x'y' wave frame of reference, with the vibration wave (OV) along x' forming an electrical angle θ relative to the x-axis;

a plurality of electrostatic transducers controlled by electrical voltages and operating along the two axes x and y, including at least, on at least one of the two masses:

a pair of detection transducers (Dx, Dy) configured to detect the movements of the vibration wave along x and y;

a pair of excitation transducers (Ex, Ey), to which excitation forces are respectively applied along x and y, via a plurality of excitation commands determined by automatic controls from the detected movements, configured to maintain the wave at a constant amplitude via an amplitude command (Ca) and, if applicable, to rotate said vibration wave via a precession command (Cp);

the inertial angular sensor further comprising:

a control and/or processing unit configured to implement a method for correcting measurement of the inertial angular sensor when vibrating, the correction method being applied when the inertial angular sensor is operating with a vibration wave (OV) vibrating along the x'-axis;

said method comprising the following steps, when the carrier is substantially stationary:

step A commanding an electrical rotation of the vibration wave (OV) according to a commanded angular value Ωc, such that the electrical angle θ scans at least one angular range of kπ radians, with k being an integer greater than or equal to 1; then step B retrieving the measured angular values Ωe measured by the inertial angular sensor over the angular range of kπ radians of the electrical angle θ for the commanded angular value Ωc, and determining the mean Ωem of the angular values measured over said angular range; then step C subtracting the commanded angular value Ωc from the mean Ωem of the measured angular values;

with steps A to C being carried out for at least two different commanded angular values so as to determine at least two means of the measured angular values; then step D determining:

the mean electrical scale factor error FEem, with the electrical scale factor corresponding to the ratio between the measured angular value due to the electrical rotation command, and the commanded angular value $\Omega c$; and the actual angular value $\Omega v$ of the carrier plus a drift value Dm of the inertial angular sensor;

said determining being carried out on the basis of the commanded angular values $\Omega c$ and of the means $\Omega em$ of the measured angular values, according to the following formula:

$$\Omega em - \Omega c = (\Omega v + Dm) + FEem \cdot \Omega c.$$

9. The inertial angular sensor as claimed in claim 8, with said inertial angular sensor being axisymmetric.

10. The inertial angular sensor as claimed in claim 8, comprising at least two vibrating movable masses (M1, M2) forming the at least two portions configured to vibrate in phase opposition relative to each other, with one movable mass being able to be disposed around another movable mass.

* * * * *